(12) United States Patent
Nudd

(10) Patent No.: US 9,824,334 B2
(45) Date of Patent: Nov. 21, 2017

(54) SYSTEM FOR UPDATING A CALENDAR OR TASK STATUS IN HOME CARE SCHEDULING VIA TELEPHONY

(75) Inventor: Geoffrey Howard Nudd, San Francisco, CA (US)

(73) Assignee: Clearcare, Inc., San Francisco, CA (US)

( * ) Notice: Subject to any disclaimer, the term of this patent is extended or adjusted under 35 U.S.C. 154(b) by 806 days.

(21) Appl. No.: 13/180,447

(22) Filed: Jul. 11, 2011

(65) Prior Publication Data

US 2013/0018688 A1 Jan. 17, 2013

(51) Int. Cl.
*G06Q 10/00* (2012.01)
*G06Q 10/10* (2012.01)
*G06Q 10/06* (2012.01)

(52) U.S. Cl.
CPC ..... *G06Q 10/109* (2013.01); *G06Q 10/06311* (2013.01); *G06Q 10/1093* (2013.01)

(58) Field of Classification Search
CPC ............... G06Q 10/06311; G06Q 10/1093
USPC .............................. 705/7.13, 7.18
See application file for complete search history.

(56) References Cited

U.S. PATENT DOCUMENTS

| | | | |
|---|---|---|---|
| 6,640,212 B1 | 10/2003 | Rosse | |
| 6,823,315 B1 | 11/2004 | Bucci | |
| 2001/0029322 A1 | 10/2001 | Iliff | |
| 2001/0038033 A1 | 11/2001 | Habib | |
| 2001/0042001 A1 | 11/2001 | Goto | |
| 2001/0051787 A1 | 12/2001 | Haller | |
| 2002/0116219 A1 | 8/2002 | Ibok | |
| 2003/0043986 A1 | 3/2003 | Creamer | |
| 2003/0043989 A1 | 3/2003 | Creamer | |
| 2003/0063732 A1 | 4/2003 | Mcknight | |
| 2003/0074228 A1* | 4/2003 | Walsh | 705/3 |
| 2003/0135095 A1 | 7/2003 | Iliff | |
| 2003/0139778 A1 | 7/2003 | Fischell | |
| 2003/0149423 A1 | 8/2003 | Fischell | |
| 2003/0163299 A1 | 8/2003 | Iliff | |
| 2004/0039628 A1 | 2/2004 | Thompson et al. | |
| 2004/0078232 A1 | 4/2004 | Troiani | |
| 2004/0153337 A1* | 8/2004 | Cruze | 705/2 |
| 2004/0249778 A1 | 12/2004 | Iliff | |
| 2005/0063420 A1 | 3/2005 | Graves | |
| 2005/0101875 A1 | 5/2005 | Semler | |
| 2005/0113650 A1 | 5/2005 | Pacione | |
| 2005/0137925 A1 | 6/2005 | Lakritz | |
| 2005/0154616 A1 | 7/2005 | Iliff | |
| 2005/0165285 A1 | 7/2005 | Iliff | |
| 2006/0030890 A1 | 2/2006 | Cosentino | |
| 2006/0031101 A1 | 2/2006 | Ross | |
| 2006/0041452 A1 | 2/2006 | Kulkarni | |

(Continued)

OTHER PUBLICATIONS http://www.onschedulesoftware.com/.

(Continued)

*Primary Examiner* — Sujay Koneru
(74) *Attorney, Agent, or Firm* — Patent Law Works LLP

(57) ABSTRACT

A telephony accessible calendar system is provided for use in a home care scheduling system for scheduling multiple daily work shifts of home care providers that includes a scheduling to organize work shifts of remote operating home care workers and confirmation to obtain an electronic signature from one or more persons operating as individual signers near the end of a work shift.

18 Claims, 6 Drawing Sheets

(56) References Cited

U.S. PATENT DOCUMENTS

| | | |
|---|---|---|
| 2006/0047551 A1 | 3/2006 | Cotten |
| 2006/0064030 A1 | 3/2006 | Cosentino |
| 2006/0136241 A1 | 6/2006 | De Vries |
| 2006/0154642 A1 | 7/2006 | Scannell |
| 2006/0229505 A1 | 10/2006 | Mundt |
| 2006/0236373 A1 | 10/2006 | Graves |
| 2006/0240771 A1 | 10/2006 | Graves |
| 2006/0280294 A1 | 12/2006 | Zhang |
| 2007/0021979 A1 | 1/2007 | Cosentino |
| 2007/0276270 A1 | 11/2007 | Tran |
| 2008/0058615 A1* | 3/2008 | Clapp et al. ............ 600/301 |
| 2008/0162393 A1 | 7/2008 | Iliff |
| 2008/0176271 A1 | 7/2008 | Silver |
| 2008/0183091 A1 | 7/2008 | Fischell |
| 2008/0242951 A1 | 10/2008 | Jung |
| 2008/0242952 A1 | 10/2008 | Jung |
| 2008/0296364 A1* | 12/2008 | Pappas et al. ............ 235/377 |
| 2009/0019061 A1 | 1/2009 | Scannell |
| 2009/0024050 A1 | 1/2009 | Jung |
| 2009/0086936 A1* | 4/2009 | Clifford et al. ............ 379/88.13 |
| 2009/0099862 A1 | 4/2009 | Fireman |
| 2009/0127328 A1 | 5/2009 | Aissa |
| 2009/0170482 A1* | 7/2009 | Alessio et al. ............ 455/414.1 |
| 2009/0177518 A1 | 7/2009 | Adams |
| 2009/0194104 A1 | 8/2009 | Van Sickle |
| 2009/0204434 A1* | 8/2009 | Breazeale, Jr. ............ 705/3 |
| 2009/0222284 A1 | 9/2009 | McEachern |
| 2009/0228321 A1 | 9/2009 | Srinivasan |
| 2009/0234916 A1 | 9/2009 | Cosentino |
| 2009/0259674 A1 | 10/2009 | Griffin |
| 2009/0290695 A1 | 11/2009 | Schulzrinne |
| 2009/0299803 A1 | 12/2009 | Lakritz |
| 2009/0313074 A1 | 12/2009 | Harpur |
| 2009/0319926 A1 | 12/2009 | Chakra |
| 2009/0326410 A1 | 12/2009 | James |
| 2010/0036667 A1* | 2/2010 | Byford et al. ............ 704/270 |
| 2010/0146499 A1 | 6/2010 | Bush |
| 2010/0174575 A1 | 7/2010 | Farrell |
| 2010/0198608 A1* | 8/2010 | Kaboff et al. ............ 705/2 |
| 2010/0211425 A1 | 8/2010 | Govindarajan |
| 2010/0223089 A1 | 9/2010 | Godfrey |
| 2010/0246791 A1 | 9/2010 | Wang |
| 2010/0268656 A1 | 10/2010 | Teicher |
| 2010/0318615 A1 | 12/2010 | Griffin |
| 2011/0010087 A1* | 1/2011 | Wons et al. ............ 701/201 |
| 2011/0072372 A1 | 3/2011 | Fritzley |
| 2011/0090901 A1 | 4/2011 | Baratz |
| 2011/0103559 A1* | 5/2011 | Andrews et al. ............ 379/52 |
| 2011/0112965 A1 | 5/2011 | Salonen |
| 2011/0115624 A1 | 5/2011 | Tran |
| 2011/0119193 A1 | 5/2011 | McLees |
| 2011/0119194 A1 | 5/2011 | McLees |
| 2011/0131285 A1 | 6/2011 | Liao |
| 2011/0131286 A1 | 6/2011 | Salonen |
| 2011/0137769 A1* | 6/2011 | Nielsen et al. ............ 705/32 |
| 2011/0145155 A1 | 6/2011 | Walter et al. |
| 2011/0153380 A1 | 6/2011 | Velusamy |
| 2011/0154335 A1 | 6/2011 | Tuovinen |
| 2011/0161085 A1 | 6/2011 | Boda |
| 2011/0161126 A1 | 6/2011 | Best |
| 2011/0178969 A1* | 7/2011 | Falchuk et al. ............ 706/45 |
| 2011/0194629 A1 | 8/2011 | Bekanich |
| 2011/0195694 A1 | 8/2011 | Midtun |
| 2011/0202269 A1 | 8/2011 | Reventlow |
| 2011/0238435 A1 | 9/2011 | Rapaport |
| 2011/0239146 A1 | 9/2011 | Dutta |
| 2011/0239158 A1 | 9/2011 | Barraclough |
| 2011/0246220 A1* | 10/2011 | Albert ............ 705/2 |
| 2011/0264622 A1 | 10/2011 | Vargas |
| 2011/0265119 A1 | 10/2011 | Jeong |
| 2011/0266339 A1 | 11/2011 | Yach |
| 2011/0270052 A1 | 11/2011 | Jensen |
| 2011/0270640 A1 | 11/2011 | Young |
| 2011/0270836 A1 | 11/2011 | Yang |
| 2011/0270922 A1 | 11/2011 | Jones |
| 2011/0270984 A1 | 11/2011 | Park |
| 2011/0271129 A1 | 11/2011 | Flannagan |
| 2011/0271192 A1 | 11/2011 | Jones |
| 2011/0271206 A1 | 11/2011 | Jones |
| 2011/0275887 A1 | 11/2011 | Birk |
| 2011/0276423 A1 | 11/2011 | Davidson |
| 2011/0281595 A1 | 11/2011 | Salonen |
| 2011/0282671 A1 | 11/2011 | Dicks |
| 2011/0282690 A1 | 11/2011 | Patel |
| 2011/0282726 A1 | 11/2011 | Brown |
| 2011/0286362 A1 | 11/2011 | Hulmani |
| 2011/0286392 A1 | 11/2011 | Harris |
| 2011/0287748 A1* | 11/2011 | Angel et al. ............ 455/414.1 |
| 2011/0288380 A1 | 11/2011 | Inciardi |
| 2011/0288880 A1 | 11/2011 | Waugh |
| 2011/0292163 A1 | 12/2011 | Haltom |
| 2011/0294099 A1 | 12/2011 | Brady |
| 2011/0295078 A1 | 12/2011 | Reid |
| 2011/0307265 A1 | 12/2011 | Bannis |
| 2011/0307266 A1 | 12/2011 | Henley |
| 2011/0307269 A1 | 12/2011 | Benja-Athon |
| 2011/0307274 A1 | 12/2011 | Thompson |
| 2011/0307284 A1 | 12/2011 | Thompson |
| 2011/0312341 A1 | 12/2011 | Moton |
| 2011/0313695 A1 | 12/2011 | Houston |
| 2011/0314397 A1 | 12/2011 | Ogle |
| 2011/0320235 A1 | 12/2011 | Bak |
| 2011/0320958 A1 | 12/2011 | Kashi |
| 2011/0320961 A1 | 12/2011 | Sriraghavan |
| 2012/0001759 A1 | 1/2012 | Nakada |
| 2012/0001932 A1 | 1/2012 | Burnett |
| 2012/0004928 A1 | 1/2012 | Benja-Athon |
| 2012/0005079 A1 | 1/2012 | Pitroda |
| 2012/0005086 A1 | 1/2012 | Pitroda |
| 2012/0010518 A1 | 1/2012 | Sarel |
| 2012/0011035 A1 | 1/2012 | Calcaterra |
| 2012/0016700 A1 | 1/2012 | Jabbour |
| 2012/0016703 A1 | 1/2012 | Blair |
| 2012/0017000 A1 | 1/2012 | Lim |
| 2012/0017206 A1 | 1/2012 | Ferguson |
| 2012/0029946 A1 | 2/2012 | Aquila |
| 2012/0030193 A1 | 2/2012 | Richberg |
| 2012/0041775 A1 | 2/2012 | Cosentino |
| 2012/0041783 A1 | 2/2012 | McKee |
| 2012/0041858 A1 | 2/2012 | Lewis |
| 2012/0042014 A1 | 2/2012 | Desai |
| 2012/0044908 A1 | 2/2012 | Spinelli |
| 2012/0045044 A1 | 2/2012 | Woicke |
| 2012/0052849 A1 | 3/2012 | Martin |
| 2012/0052854 A1 | 3/2012 | DiMeo |
| 2012/0058012 A1 | 3/2012 | Silver |
| 2012/0059667 A1 | 3/2012 | Benja-athon |
| 2013/0006718 A1 | 1/2013 | Nielsen et al. |

OTHER PUBLICATIONS http://www.911dispatch.com/comm-center-shifts-scheduling/.
http://www.ozgrid.com/search/templates.htm.
http://employee-scheduling-software-review.toptenreviews.com/.
http://www.bmscentral.com/products/schedule/overview.aspx.
http://workawesome.com/productivity/calendar-or-to-do-list-two-task-management-tools-compared/.
http://work-schedules.softalizer.com/.
http://www.vip-qualitysoft.com/.
Google Calendar (www.google.com/calendar).
Yahoo! Calendar (calendar.yahoo.com).
Santrax (www.santrax.com).
Twilio (http://www.twilio.com).
HomeTrak (www.hometrak.com).
Tropo (www.tropo.com).

* cited by examiner

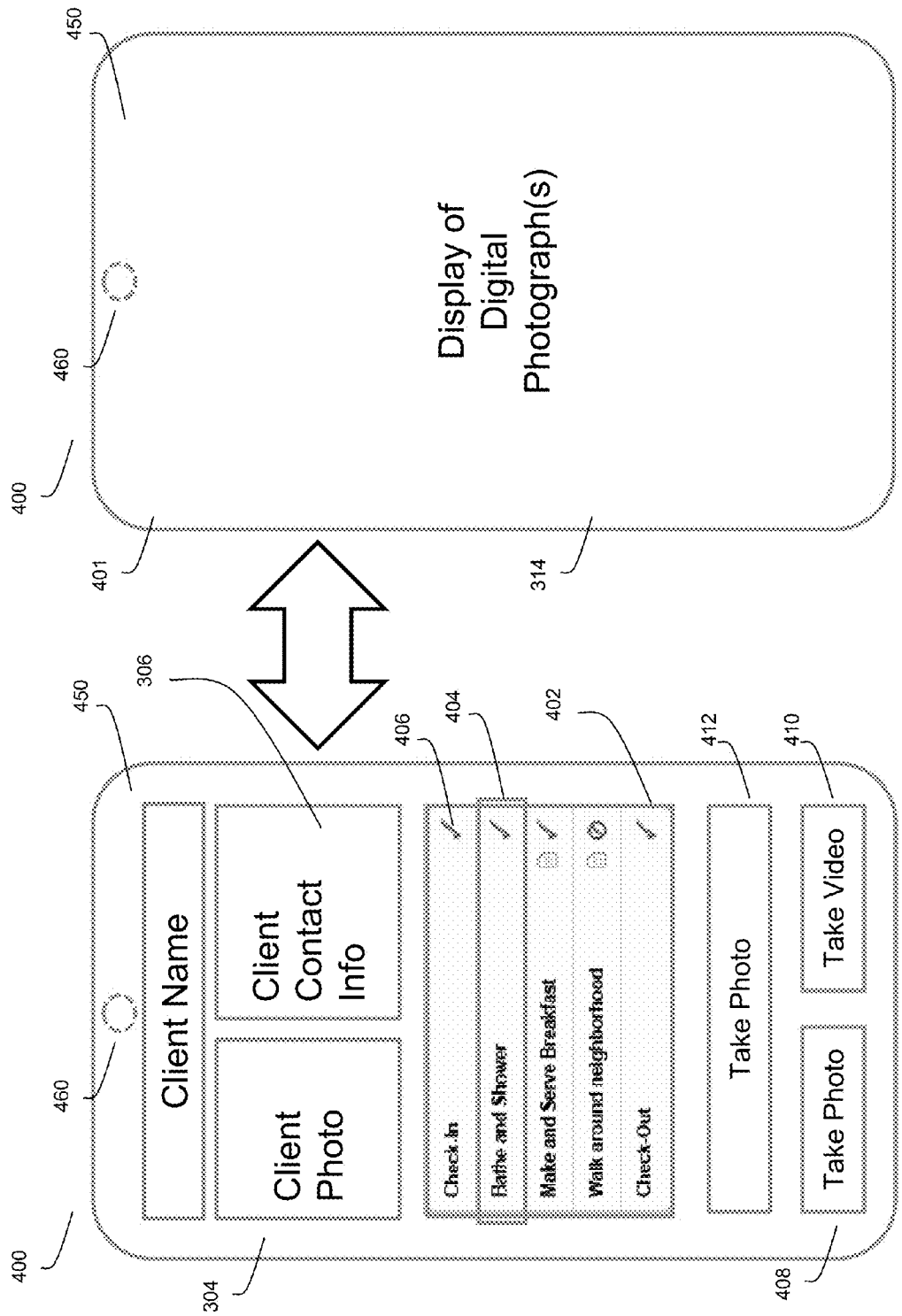

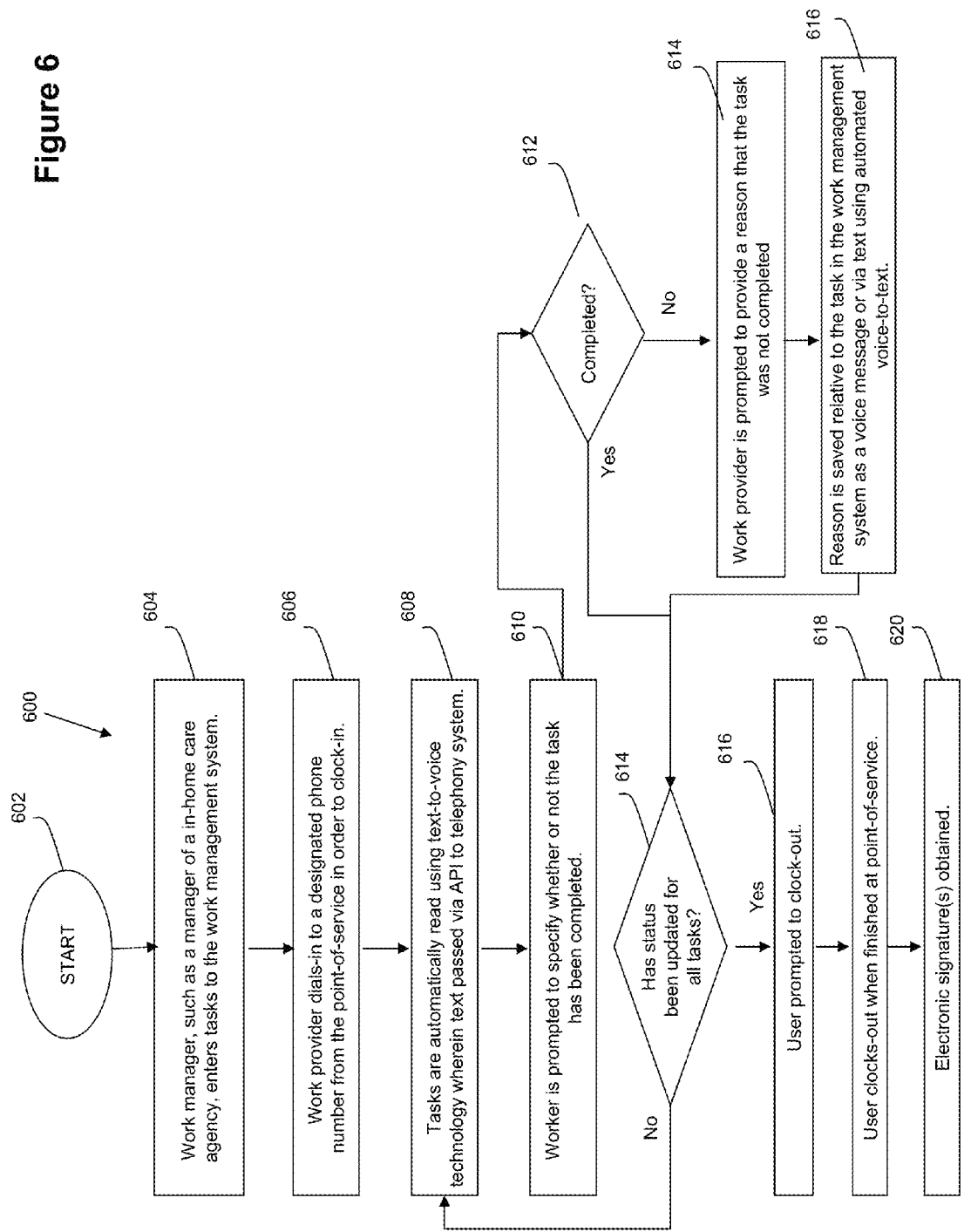

SYSTEM FOR UPDATING A CALENDAR OR TASK STATUS IN HOME CARE SCHEDULING VIA TELEPHONY

BACKGROUND

The invention relates to a computer-enabled approach for updating a calendar or task status via a mobile tablet or telephony.

Computer-enabled calendar systems date to the early days of software. In the 1990s and thereafter, a growing number of online calendar systems have been introduced which enable a user to, among other functions, create new events and tasks, schedule with other users, and send and receive reminders. Many of these calendars are now available online, such as that provided by Google Calendar, wherein they allow access across geographies and via any Internet-enabled terminal.

A problem with existing online calendar systems is in their management of "tasks", which may be defined as an assignment of work to-be-completed with an assigned date on which the work is to be completed and/or started and/or in-progress, and at least one complete or incomplete state. As defined herein, tasks are a superset which contains "events" which are typically meetings or scheduled occurrences in which the work to-be-completed primarily or exclusively involves attendance or participation in the event itself (i.e. a meeting). An important differentiator between events and tasks which are not events, which are often referred to as "to do's" and which we shall call "non-event tasks", is that non-event tasks lend themselves to tracking via checklists, a well-known and remarkably effective and simple way to track outstanding and completed tasks, wherein it is generally not effective or useful to track events via checklists (i.e. a checklist of outstanding and/or completed meetings).

A subtle but important oversight is that the existing online calendar systems such as Google Calendar, Yahoo Calendar and others have built rich functional capabilities for the management of events such as the ability to create recurring series of events (i.e. a meeting that occurs every Monday at 10:00 AM) or the ability to send invitations to a variety of attendees, but have not introduced similar capabilities for the management of non-event tasks. Conversely, existing calendar systems have introduced functionality such as checklists for non-event tasks which have not been created for events. This introduces a significant shortcoming, particularly in the creation of work management systems that provide the ease of use and flexibility of a calendar interface with the work tracking capabilities of checklists. In particular, the inventor finds that it is an important shortcoming of the existing art that no existing online calendar systems enable the ability to create recurring non-event tasks in a computer-enabled system with a checklist interface that allows a user to mark the status of a task (including but not limited to marking the status of a task as complete).

Moreover, today, computer-enabled online calendar systems are only accessible via a computer terminal with a visual interface such as a computer monitor and require some form of Internet connection. As there are today no means of creating recurring non-event tasks in a calendar system and managing their completion via a checklist interface, it follows that there are no means of interfacing with said new inventive systems via any means. It would be advantageous if the aforementioned problem was solved and moreover if the functionality could be accessible by a remote computer terminal connected to the Internet. Moreover, for situations in which a remote computer terminal connected to the Internet is difficult or cost-prohibitive, it would be advantageous if there were other means to interface with said inventive online calendar functionality.

While there exists simple clock-in and clock-out functionality via telephony relative to expected work times and/or times of worker's shift, such as that provided by Santrax (www.santrax.com), there is presently no way to access such calendar systems with task-level specificity via telephony. Solutions such as Santrax have existed for many years without solving the problem of task-level specificity, nor have they solved the aforementioned problems with the treatment of non-event tasks. These are critical oversights that significantly reduce the usefulness of the known art.

By way of example and without limitation, in the in-home health care industry, solutions like Santrax are used to track clock-in and clock-out times relative to shifts using telephony to update the clock-in or clock-out status of a remote caregiver. While this system allows specification of work shifts and remote updates of clock-in and clock-out status, the detailed tasks that comprise a care plan cannot be updated via the remote telephony system. There are complex challenges associated with enabling such a system, such as text-to-voice automated translation of tasks in a care plan, which heretofore have not been solved.

Additionally, again considering without limitation the present example of in-home care agency management software, today there does not exist a flexible, easy-to-use calendar system that allows the specification of non-event tasks with features like recurrence of an event at specific times during specific days of the week, weeks in the month, etc. and the ability to update status in an easy-to-use electronic checklist. To have such a system would provide flexibility and ease-of-use that today does not exist for the service of the in-home care agency industry.

Additionally, considering without limitation the present example of in-home care agency management software, today there exists a need for obtaining a verification, such as an electronic signature, to help ensure that updates to the status of shift(s) and/or non-event task(s) are accurate. By way of example, many regulatory bodies and insurers require the signature of the care recipient as a condition of providing payment to a provider of in-home care. One reason they require the signature of the care recipient is as verification means to help ensure that the care was provided as reported by the caregiver and/or agency. Also what is needed is a paperless way of determining what non-event tasks the caregiver has performed and verifying it via the signature of the care recipient. Moreover, there is a problem to be solved of obtaining a verification means, such as an electronic signature, that minimizes the potential for fraud or falsification. Thus, there exists a need for a paperless system which allows the comprehensive reporting of clock-in times, clock-out times, non-event task completion status, and fraud-resistant verification, preferably consisting of an electronic signature obtainable from the care recipient.

These shortcomings with the existing art lead to many problems including very limited transparency and control over the care plan to stakeholders such as in-home care managers, healthcare providers, and the family members of a patient or client. Moreover, in the example of the in-home care industry, these shortcomings today are addressed via mechanisms like paper care journals which reside in the home of the patient and which are periodically updated by caregivers. The paper care journals are often overlooked by caregivers and the in-home care managers and the families of the patients have no visibility to the care provided and the tasks performed. This industry example illustrates the very significant and important problems with the existing art, and the quality of care can be significantly improved by solving these problems.

Thus, what is needed is an approach to addressing these shortcomings and of work management systems with ease of use, flexibility, and cost-effective accessibility in a plurality of locations. As will be seen, the invention provides such an approach in an elegant manner.

BRIEF DESCRIPTION OF THE DRAWINGS

Various preferred embodiments of the present invention are illustrated by way of example, and not by way of limitation, in the figures of the accompanying drawing and in which like reference numerals refer to similar elements and in which:

FIG. 4 and FIG. 5 are wireframe diagrams that illustrate interfaces for caregivers and their patients which are part of the healthcare information system described herein, and which are preferably displayed on a touch screen tablet (by way of example, an Apple iPad) which is used by a caregiver to manage and document care tasks, and which also functions as a digital picture frame when not in use by the caregiver or other users.

FIG. 6 is a flow diagram that illustrates a process by which the status of specific task information is updated via telephony using computer-enabled text-to-voice conversion and in which verification information is obtained.

DETAILED DESCRIPTION

Figure 1:
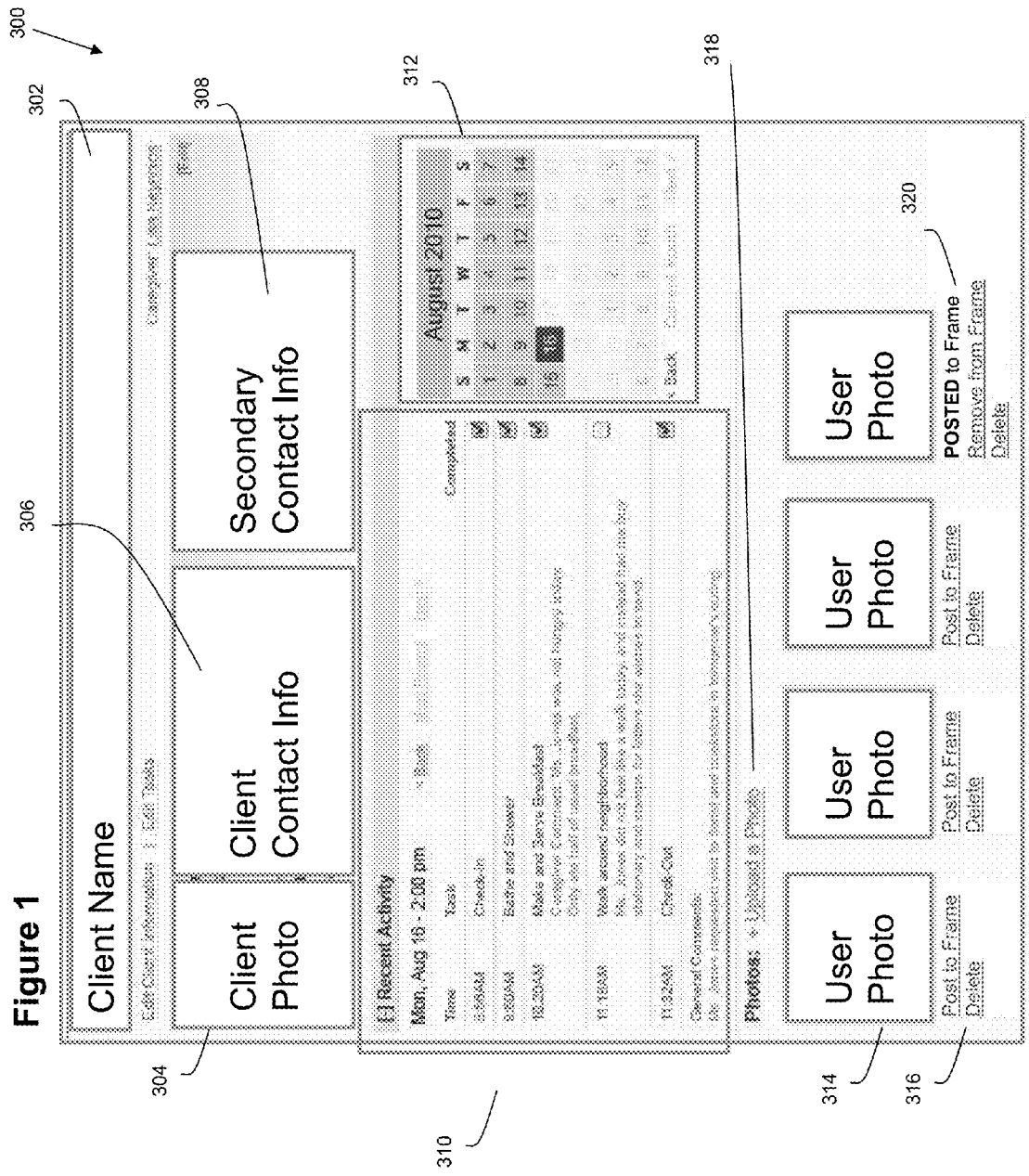
FIG. 1 is a wireframe diagram that illustrates an interface of a web-based portal for a work management system which provides tracking and management of work, a photo storage service which allows the automatic display of photos which are uploaded via said web-based portal to a digital picture frame, the creation and management of non-event tasks, and the updating of the status of non-event tasks via a checklist interface and/or telephony.

This patent application incorporates by reference U.S. provisional patent application No. 61/394,676, "System and Apparatus for Automatically Displaying Photos Remotely Uploaded to a Digital Picture Frame" filed on Oct. 29, 2010.

In one view, the invention is directed to a telephony accessible calendar system for use in a home care scheduling system for scheduling multiple daily work shifts of home care providers. In one embodiment, a calendaring system includes a scheduling system configured to organize work shifts of remote operating home care workers and a confirmation module configured to obtain an electronic signature from one or more persons operating as individual signers near the end of a work shift.

In one embodiment, an apparatus and computer-enabled system implemented by software is provided for the creation of non-event tasks in a calendar system wherein the entry of a single non-event task can be made recurring on a daily, weekly, or monthly basis according to parameters set by the user; and/or wherein the non-event task may be assigned to one or more persons or groups of persons for completion; and/or wherein the completion status of one or more non-event tasks may be updated via a computer-enabled terminal connected to the Internet; and/or wherein one or more users at remote locations may view the updated completion status of the one or more non-event tasks; and/or wherein an exception state may be noted relative to the completion of one or more non-event tasks and a reason provided by the assigned person(s); and/or wherein the completion status of the one or more non-event tasks is managed by a checklist interface.

In another embodiment, the aforementioned calendar systems may be interfaced with via a telephony system and/or via a computer connected to the Internet wherein the telephony system allows the person(s) assigned to a non-event task to update the completion status of the non-event task. In one embodiment, the computer-enabled system uses automated text-to-voice technology such as that enabled by commercial providers such as Twilio (www.twilio.com) accessed via an application programming interfaced (API) in conjunction with software code known by those skilled in the art to read instructions or other parameters of one or more non-event tasks to the person(s) assigned. In another embodiment, the computer-enabled system accepts input via telephone from the person(s) assigned by which the person (s) updates the status of the non-event task. By way of example, by pressing the number "one" on the telephone after the computer-enabled system reads the instructions and/or title for the non-event task, the person(s) assigned marks the task complete. In another embodiment, if the person(s) assigned notes an exception to the expected status of the non-event task such as updating the status as "incomplete," then the person may communicate a voice message which is associated with the task and/or group of tasks which communicates additional information which may include, by way of example, the reason that the non-event task was not completed.

In another embodiment, the voice message is stored in a system accessible via the Internet by which the status of one or more tasks (the "checklist") may be viewed by one or more users. In another embodiment, a transcript of the voice message is recorded and displayed next to the relevant non-event task or group of tasks. In another embodiment, the transcript of the voice message is created via automated computer-enabled voice-to-text translation as enabled by commercial providers such as Twilio, accessed via API in conjunction with other software code, the implementation of which can be performed by those skilled in the art.

In another embodiment, the aforementioned telephony-accessible calendar system provides the capability of obtaining an electronic signature from one or more persons at the end of a work shift. In one embodiment, said system uses text to voice technology to read information about the shift to said one or more persons, wherein information may include but is not limited to the clock in time and the non-event task completion status, and the said one or more persons is prompted to provide an electronic signature to verify the information about the shift. In one embodiment, the electronic signature is provided via a confidential personal identification number ("PIN") that is known only to the person asked to provide verification. In another embodiment, the electronic signature is provided via a voice recording that the signer leaves via a telephone after listening to the aforementioned information about the shift. In another embodiment, the PIN is used in conjunction with the voice recording to comprise a fraud- and falsification-resistant electronic signature.

In another embodiment, an indicator of the electronic signature is provided in an electronic log accessible via website in association with related information about the shift. In another embodiment, a link to a copy of the voice-recorded signature is provided in an electronic log accessible via website in association with related information about the shift.

In another embodiment, the aforementioned telephony-accessible calendar system is used as part of a work management system for the management of a remote workforce.

In another embodiment, the aforementioned telephony-accessible calendar system is used as part of a work management system for in-home care agencies enabling the management of caregivers working remotely in the homes of patients and/or clients to provide care.

In another embodiment, the telephony system verifies the location of the remote worker at the time the status of a non-event task is recorded by comparing the caller ID of the telephone from which the remote worker is calling to a database of known telephone numbers and locations.

In another embodiment, the work management system automatically generates an alert which is communicated to one or more users in the event that a non-event task is not completed as expected per parameters designated by one or more users.

In the following description, for the purposes of explanation, specific details are set forth in order to provide a thorough understanding of the present invention. However, it will be apparent that the present invention may be practiced without these specific details. In other instances, well-known structures and devices are depicted in block diagram form in order to avoid unnecessarily obscuring the present invention.

FIG. 1 is a wireframe diagram that illustrates an interface of a web-based portal for a work management system which provides tracking and management of work, a photo storage service which allows the automatic display of photos which are uploaded via said web-based portal to a digital picture frame, the creation and management of non-event tasks, and the updating of the status of non-event tasks via a checklist interface accessible by a computer connectable to the Internet, a mobile tablet connectable to the Internet, and/or telephony.

In one embodiment, a touch screen tablet functioning as a digital picture frame and connected to the Internet, such as an Apple iPad, functions as a device by which one or more work providers manages and documents tasks at the client point-of-service.

Element 302 illustrates a field by which identifying information of a client is displayed. Element 304 illustrates a field by which a photo of the client is displayed. Elements 306 and 308 illustrate fields by which contact information of the client is displayed. The reader may imagine that a variety of user or user group profile information may be displayed.

Elements 310 and 312 allow an integrated work management system to perform a variety of functions which may include but are not limited to: (1) tracking the completion and status of non-event tasks, (2) enabling work providers to provide input to said work management system via a separate interface (see FIG. 2 and FIG. 3) and/or via telephony as will be described, and/or (3) allows the client or family of the client to view tasks which have been completed by a work provider.

In one embodiment, any user of the web portal 300 must be authenticated before being able to view the web portal 300 in order to protect the confidential and private information of the client. Means of authentication are well-known to those skilled in the art and include but are not limited to password protection and/or use of a personal identification number (PIN).

Element 310 illustrates a list of non-event tasks ("checklist"). In one embodiment, the list provides status information for each task which may include but is not limited to a variety of states such as to-be-completed, complete, incomplete, or exception. As shown in the present example, the task list 310 includes a variety of information for each task, including but not limited to the time at which a work provider completed a task and/or made an input relative to the task, a description of the task, comments submitted by the work provider, and whether or not the task was completed. Element 312 illustrates a calendar input interface which when a day is clicked queries the set of non-event tasks related to that day, including completed and incomplete tasks, and tasks which are planned in the future, and in one embodiment displays said tasks in a task list 310.

In one embodiment, a work provider logs-in to the system from the point-of-service of the client, sees the non-event tasks which are to be completed, and marks tasks as complete and/or incomplete and/or enters comments as the work provider works towards the completion of tasks. In one embodiment, said comments and completion inputs from the work provider are transmitted via the Internet to the work management system, and the completion information about the tasks and the comments are shown in element 310 when one of a variety of authorized users, such as a manager or administrator, the work provider, the client, or the family or colleagues of the client view the web portal 300. The provided herein are embodiments having multiple benefits including transparency of work performed to the aforementioned parties.

Element 318 illustrates a link to "Upload a Photo" which directs to a web-enabled interface which features an input field, a "Browse" button to find photo files on a local system, and an "Upload" button. Via these buttons and associated features, a photo file may be selected and uploaded to the work management system and thereby displayed in element 314 and stored. Systems and methods for uploading a photo file over the Internet are well known to those skilled in the art. The photo 314 may thereby be subsequently displayed by the system serving as a point of service input device for work providers, which thus in a preferred embodiment also serves as a digital picture frame.

Figure 2:
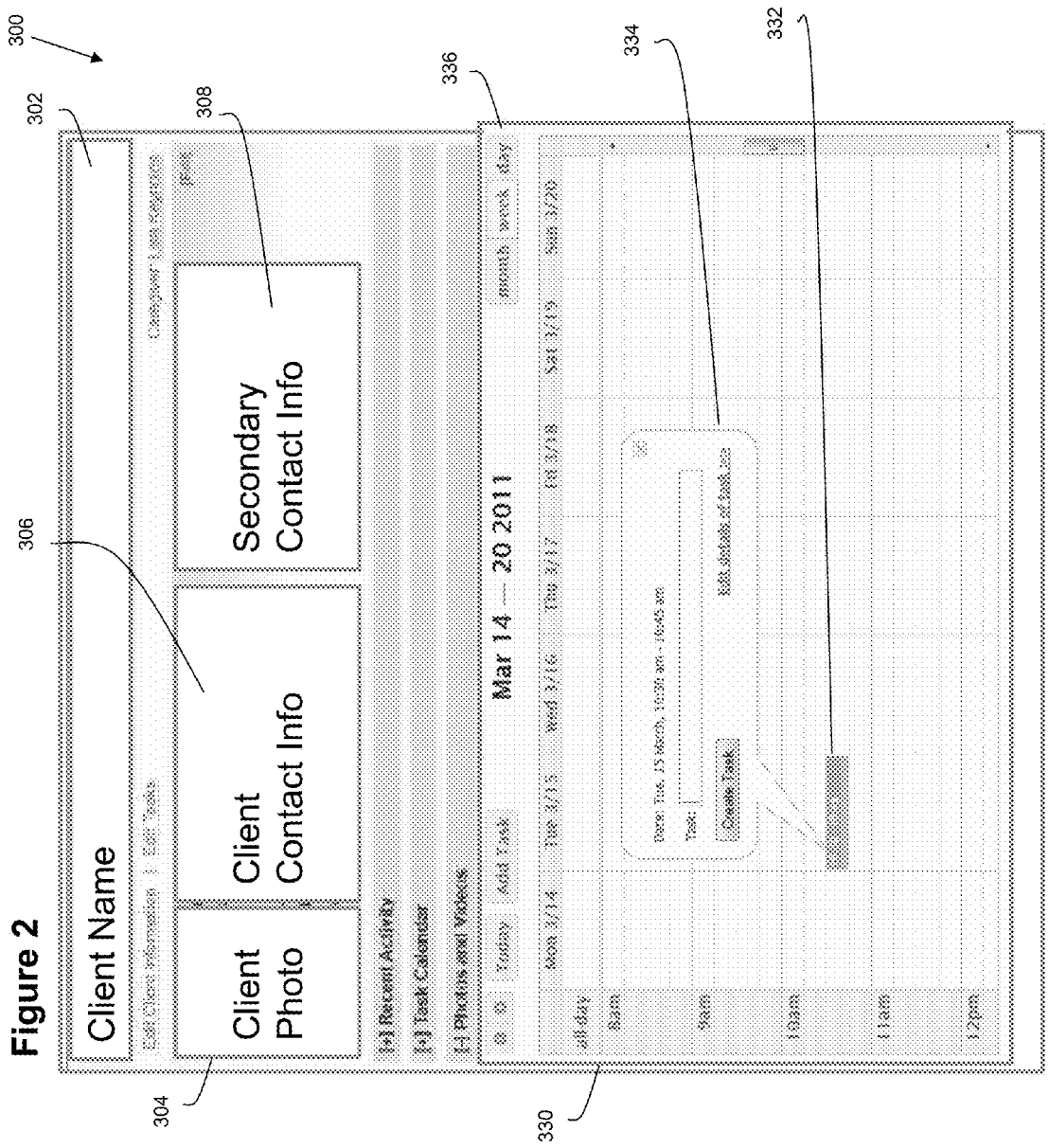
FIG. 2 is a wireframe diagram that illustrates the task input calendar interface of a web-based portal for a work management system which provides tracking and management of work, a photo storage service which allows the automatic display of photos which are uploaded via said web-based portal to a digital picture frame, the creation and management of non-event tasks, and updating of the status of non-event tasks via a checklist interface and/or telephony.
Figure 3:
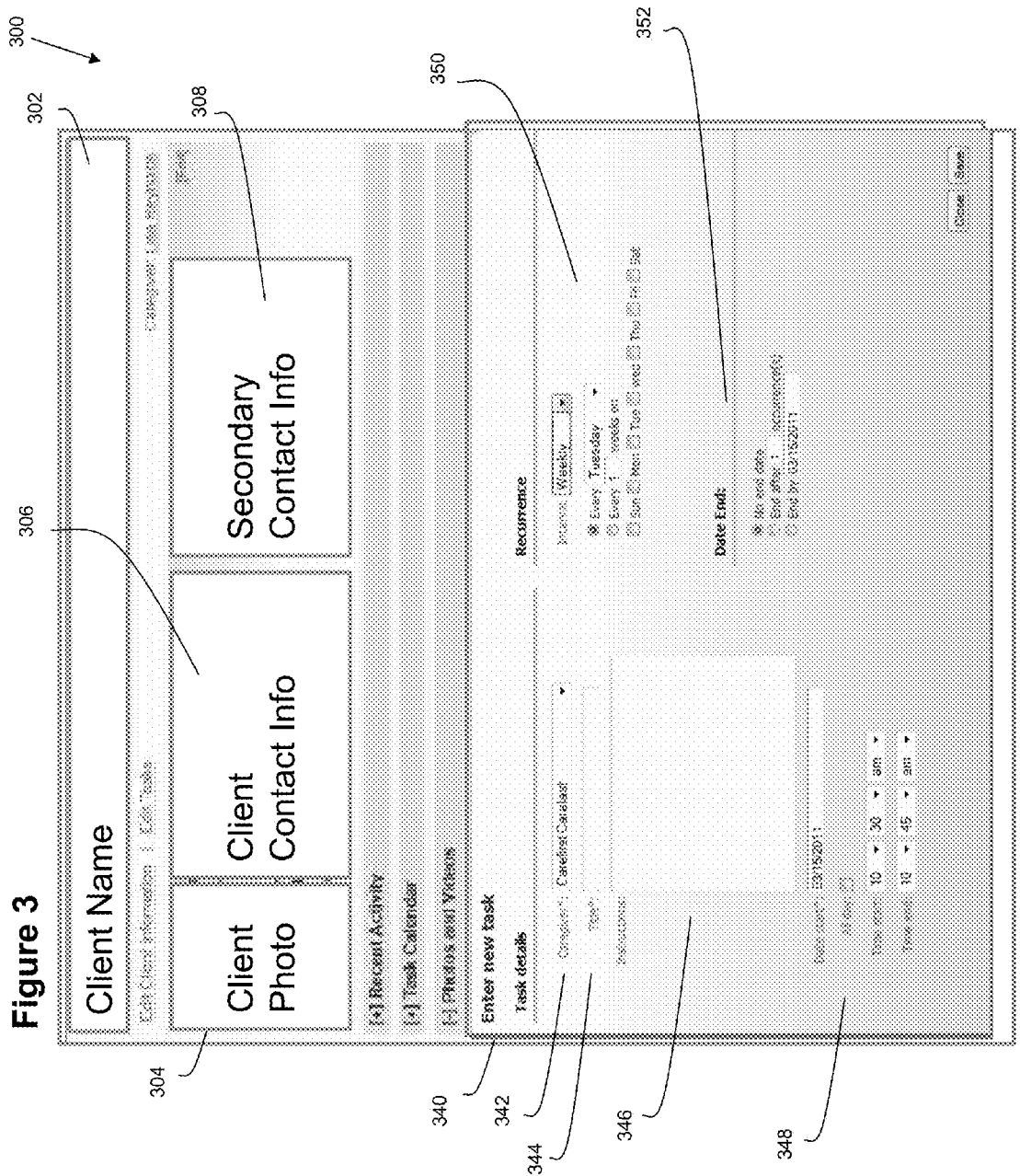
FIG. 3 is a wireframe diagram that illustrates a task details portion of a task input calendar interface of a web-based portal for a work management system which provides tracking and management of work, a photo storage service which allows the automatic display of photos which are uploaded via said web-based portal to a digital picture frame, the creation and management of non-event tasks, and the updating of the status of non-event tasks via a checklist interface and/or telephony.

Via this interface, family members, friends, or other persons authorized by the client and/or work provider are able to both monitor work and upload photos 314 for display on the digital picture frame, which displays the photos 314 when said frame is not in use by the work provider for the provision and tracking of work (see FIG. 2 and FIG. 3). Element 316 is a pair of hyperlinks to "Post to Frame" or "Delete", which respectively trigger functions to designate the photo 314 for download by the digital picture frame, or to delete the photo 314 from the work management system. The links illustrated in element 316 are displayed when a photo 314 is displayed on the work management system, but which have not been designated for download by the digital picture frame.

Element 320 illustrates the text, hyperlinks and features which are preferably displayed and enabled, respectively, when a photo 314 has been designated for display in the digital picture frame. The words "POSTED to Frame" indicate that the photo 314 has been designated for display in the digital picture frame. The "Remove from Frame" hyperlink allows the user to remove the designation that the photo 314 is to be displayed in the digital picture frame. The "Delete" hyperlink in element 316 allows the user to delete the photo 314 entirely from the work management system, and thereby to also delete the photo 314 from the digital picture frame.

FIG. 2 is a wireframe diagram that illustrates the task input calendar interface 330 of a web-based portal 300 for a work management system which provides tracking, management and assignment of work, a photo storage service which allows the automatic display of photos which are uploaded via said web-based portal to a digital picture frame, the creation and management of non-event tasks, and updating of the status of non-event tasks via a checklist interface and/or telephony.

In one embodiment, the task input calendar interface 330 is readily accessible and adjacent to the client-specific interface with elements 302, 304, 306 and/or 308, and/or the interface related to task status 310, and/or the interface related to digital photo functionality containing elements 314, 316, 318 and/or 320.

In task input calendar interface 330, a user may create a new work task by clicking any time on the calendar and/or by clicking an "Add Task" button. In one embodiment, the rapid addition of tasks is enabled by simply clicking on a time in the calendar 332, typing the name and/or instructions of the Task, and clicking "return." In another embodiment, the completion status of the non-event task can be tracked via the interface described in element 310 based on input at the point-of-service from the work provider.

If the task has additional parameters including but not limited to detailed instructions or recurrence, the user may click "Edit details of the task" in the interface 334 to provide the additional parameters. By way of example and without limitation, see FIG. 3 for an illustrative list of additional parameters that may be specified.

In one embodiment, various views of the calendar may be used by clicking inputs 336 including but not limited to a view of the current day, another day, a week, or a month. As such, a level of calendar granularity convenient to the user may be viewed.

In another embodiment, the calendar is implemented via Ajax, a group of 1interrelated web development methods used on the client-side to create interactive web applications.

FIG. 3 is a wireframe diagram that illustrates a task details portion 340 of a task input calendar interface of a web-based portal 300 for a work management system which provides tracking and management of work, a photo storage service which allows the automatic display of photos which are uploaded via said web-based portal to a digital picture frame, the creation and management of non-event tasks, and the updating of the status of non-event tasks via a checklist interface and/or telephony.

In one embodiment, the task details interface 340 contains an input to assign the work provider 342. For illustrative purposes and by way of example, said input 342 may be to assign a work provider of the type "caregiver" wherein the work management system would be an in-home care work management system. The aforementioned is provided by way of example, and the invention has applicability to any variety of work types and work providers. In another embodiment, the name of the work provider is assigned a default value based on the primary work provider assigned to the particular client, but wherein another work provider may be designated specifically for the task.

In one embodiment, an input 344 captures the title and/or high-level instructions for the task. In another embodiment, an input 346 allows input of detailed instructions for the task. In another embodiment, an input 348 allows input of the start date, start time and end time of the task and/or the designation of the task as an "all day" task.

In another embodiment, the user may specify recurrence of the task via a collection of inputs in interface areas 350 and 352. The recurrence may be daily with a variety of parameters including but not limited to every day, every "x" number of days, every weekday, etc.; the recurrence may be weekly or every "y" weeks with a variety of parameters including but not limited to every week on one or more specific days of the week, or monthly on every "z" of every month, every "z" day (i.e. Thursday) of every month, etc. Systems for establishing recurrence for an event or meeting are well-known to those skilled in the art; however these systems for creating recurrence have not been applied to the creation of non-event tasks in an online calendar system.

One benefit of embodiments described herein is the ability to specify recurring non-event tasks in the calendar interfaces 330 and 340 wherein the completion status of the non-event tasks may be tracked via a checklist 310. Another notable benefit is the ability to modify the status of a non-event task remotely via a Internet-connected computer terminal as shown in FIGS. 4 and 5, or via telephony as described in FIG. 6.

While the wireframes shown in FIGS. 1, 2 and 3 illustrate particular interface layouts for a work management system, one skilled in the art can anticipate many other specific variations which accomplish the features and benefits of embodiments described herein. Additionally, many of the elements such as 302, 304, 306, 308, 314, 316, 318, 320 and others may be generalized for use of the disclosed embodiments in the context of a social networking website, photo sharing website, or other system.

A specific case of the disclosed work management system is the application of said system for in-home care agencies wherein a multitude of clients receives in-home care and the work provider is a caregiver. The work management systems described herein are particularly valuable in improving the lifestyle and happiness of elderly patients receiving in-home care from a caregiver by enabling the adult children and family of elderly patients to keep track of the provision of care and also to share said photos with the elderly patients. For an in-home care agency which manages care plans for a number of clients and which manages a number of caregivers, the system provides real-time transparency to care and a simple, easy-to-use interface for scheduling care.

FIG. 4 and FIG. 5 are wireframe diagrams that illustrate interfaces for caregivers and their patients or clients which are a specific instance of the aforementioned work management system described herein, and which are preferably displayed on an Internet connectable touch screen tablet (ex. Apple iPad) which is used by a caregiver to manage and document care tasks, and which also functions as a digital picture frame when not in use by the caregiver or other users. It may be appreciated by those skilled in the art that features described herein as accruing to the benefit of caregivers could be generalized to work providers of other types and accrue to the benefit of any number of varieties of remote work providers, and similarly the care management features and benefits described can accrue to the benefit of any variety of organizations involved in the management of remote work providers.

Element 400 illustrates a computer system with an interface 450, and shows one embodiment in which said computer system 400 is a touch screen computer tablet in which inputs to the computer system may be made by the user by touching the display screen interface 450, and which includes a built-in digital camera 460 which can take digital photographs that in turn can be stored, manipulated and transmitted by the computer system 400. Such computer systems 400 are well-known and are widely distributed and sold, including by way of example the Apple iPad. Element 400 illustrates the touch screen tablet in a mode in which the interface 450 is configured to be used by a caregiver as part of a work management system to manage and track the completion of care tasks.

FIG. 5 illustrates the touch screen tablet computer system 400 in a mode in which the interface 450 is configured for the display of photos 314 in accordance with the system's 400 additional capability as a digital picture frame.

Element 402 is a list of tasks which are to be completed by the caregiver. In one embodiment, the caregiver may click or otherwise input to any individual task 404 listed to changes its status, by way of example, from "Incomplete" to "Complete." In another embodiment, the caregiver may double-click or otherwise input to any individual task listed 404 to write one or more comments relative to the task 404. In one embodiment, each task 404 shows a completion indicator 406 which indicates the status of the task 404, and/or an indication 406 that comments have been made about the task 404, and/or an indication 406 there are detailed notes about the task 404 which may be stored on the work management system, and wherein the absence of such a displayed indicator 406 can also indicate the status of a task 404. The user may appreciate that a variety of information may be provided by such an indicator 406 for each task 404.

In one embodiment, after the caregiver changes the status of one or more tasks 404 on the task list 402, the changes in the status of the one or more tasks are transmitted to the work management system wherein the updated status of the tasks 404 can be displayed on the list of tasks 310 in the web portal interface illustrated in FIG. 1.

Element 408 illustrates a button which is displayed on the interface 450 which when clicked, in one embodiment, configures the system 400 and camera 460 to take a digital photograph. In one embodiment, the caregiver authenticates his or her identity upon checking-in to a client site and/or prior to viewing tasks and/or changing the status of any tasks, such that said photo may be automatically uploaded to the work management system without subsequent authentication by the caregiver.

In another embodiment upon clicking the button 408, the caregiver is prompted by software running on the system 400 to confirm with a "yes" or "no" response whether or not the client has given explicit permission to the caregiver for such a photograph to be taken. In another embodiment, the caregiver is prompted via the interface to physically hand the system 400 to the client wherein the client is instructed to authenticate his or her identity with a password or other means in order to enable a photograph to be taken and uploaded to the work management system. The prompts described herein assist with compliance with laws that protect the privacy and confidential health information of clients.

In another embodiment, any photograph which is taken by the system 400 when used in conjunction with the work management system, for example, by clicking the button 408, is restricted such that it is not stored on the system 400 after the caregiver logs out of the work management system, and/or such that said photograph may only be stored permanently if it is transmitted over the Internet to the work management system, and/or stored on said work management system in a secure, remote database, wherein the photo is subsequently deleted from the device 400 after the caregiver logs-out of the present session with the device 400. Thus, photographs taken by the caregiver of the client are restricted in circulation such that the one or more photographs can only be viewed via secure work management interfaces such as illustrated in FIG. 1.

Element 410 illustrates a button which is displayed on the interface 450 which when clicked, in one embodiment, configures the system 400 and camera 460 to take a digital video. The aforementioned functions and features for taking a photo by pressing the button 408 parallel those functions and features for taking a video by pressing the button 410, with the difference that the media file is a digital video file instead of a digital photo file in the case that button 410 is pressed.

In another embodiment, a button 412 triggers means to obtain an electronic signature as means of verifying the completion indicators 406 in conjunction with the list of tasks 402. In one embodiment, the electronic signature is obtained by moving a fingertip or stylus over the surface of a touch screen monitor as is well-known to those skilled in the art. In another embodiment, the electronic signature is obtained by the input of a confidential PIN as is well-known to those skilled in the art. In another embodiment, the electronic signature is obtained by the signer recording a voice message which is recorded and stored in association with said list of tasks 402 and completion indicators 406. In another embodiment, the aforementioned one or more means of obtaining electronic signatures are used in combination to reduce risk of fraud or falsification. Other means of obtaining an electronic signature may be anticipated by those skilled in the art.

FIG. 5 illustrates the touch screen tablet computer system 400 in a mode in which the interface 450 is configured to display one or more photos 314 in accordance with the system's 400 additional capability as a digital picture frame. This mode may be activated according to settings configured by the client, by the caregiver, by a caregiver administrator, or by other users and/or administrators of the integrated work management system, and/or may be preset in software stored on the system 400, or by other means which are understood to those skilled in the art.

FIG. 6 is a flow diagram which illustrates the use of telephony instead of a touch screen tablet or other remote Internet interface as means to input updates to tasks in the work management system and in which verification information is obtained.

In the aforementioned scenario in which the work management system is used for the management of an in-home care agency, there is sometimes the problem that the remote terminals by which task information is updated are too expensive to be afforded by the client or by the in-home care agency. Moreover, many clients do not have Internet connectivity in their homes making it difficult and/or expensive to transmit updates of task status to the work management system. This problem, while acute in the in-home care agency industry, is also common to other industries which are dependent on a remote workforce that does not have readily available access to a computer terminal with connection means.

In the late 2000s, an increasing number of telephony services providers emerged such as Twilio (www.twilio.com) and Tropos (www.tropos.com) which provide application programming interfaces (APIs) which are readily usable by those skilled in the art of software programming to build computer-enabled applications which use telephony, including voice recognition, voice-to-text automated transcription, text-to-voice technologies, and text messaging, to serve a variety of purposes.

Embodiments described herein solve this problem via the use of telephony and the new commercially available telephony services. In one embodiment, the aforementioned calendar embodiments may be interfaced with via a telephony system and/or via a computer connected to the Internet wherein the telephony system allows the work provider(s) assigned to a non-event task to update the completion status of the non-event task.

In one embodiment, the computer-enabled system uses automated text-to-voice technology such as that enabled by commercial providers such as Twilio (www.twilio.com) accessible via an application programming interfaced (API) in conjunction with software code known by those skilled in the art to read instructions or other parameters of one or more non-event tasks to the person(s) assigned.

In another embodiment, the computer-enabled system accepts input via telephone from the person(s) assigned by which the person(s) updates the status of the non-event task. By way of example, by pressing the number "one" on the telephone after the computer-enabled system reads the instructions and/or title for the non-event task, the person(s) assigned inputs a status update to mark the task as complete in the work management system.

In another embodiment, if the person(s) assigned notes an exception to the expected status of the non-event task such as updating the status as "incomplete," then the person may communicate a voice message which is associated with the task and/or group of tasks which communicates additional information which may include, by way of example, the reason that the non-event task was not completed.

In another embodiment, the voice message is stored in a system accessible via the Internet by which the status of one or more tasks (the "checklist") may be viewed by one or more users. In another embodiment, a transcript of the voice message is recorded and displayed next to the relevant non-event task or group of tasks. In another embodiment, the transcript of the voice message is created via automated computer-enabled voice-to-text translation as enabled by commercial providers such as Twilio accessibly via API in conjunction with other software code, the implementation of which is known to those skilled in the art. By way of example and without limitation, the voice message or its transcription may be displayed in a checklist on a web portal 300 such as illustrated in element 310 of FIG. 1.

Referring now to FIG. 6, starting at 602, the work manager enters tasks to the work management system in step 604. In one embodiment, the tasks are entered to the work management system via a calendar interface 330 in a web portal 300 with the additional features of being able to specify recurrence via inputs 350 and 352. In another embodiment, the tasks are entered relative to a specific client and the client contact information 306 includes the location at which the service is to be provided and the telephone number of the client.

In step 606, the work provider dials-in to a designated phone number from the point-of-service in order to clock-in. In one embodiment, the work management system compares the caller ID of the telephone from which the work provider is calling to the contact information 306 of the client to verify that the work provider is at the proper location.

In step 608, tasks are read to the work provider sequentially using text-to-voice technology by passing text information related to the task such as the desired start time, the desired end time, the title or high-level instructions, and/or detailed instructions to a telephony service provider from the work management system via API. Telephony service providers such as Twilio (www.twilio.com) and related APIs are well-known to those skilled in the art. Thus, the work provider is prompted with the task(s) to be performed.

In one embodiment, all of the tasks to be performed within a specific period of time or shift are automatically read to the work provider in the first reading after the clock-in step 608 wherein there are no interruptions for prompts requesting completion status so that the work provider can be informed of the tasks to be performed, and wherein in subsequent readings, following the reading of each task there is a prompt in step 610 to the work provider to update the status of each individual task.

In another embodiment, there is no such initial "read through" of tasks. Instead, after clock-in in step 606, the tasks are read one at a time in step 608 and after each task is read, the work provider is prompted to answer whether or not the task has been completed in step 610. The work provider can respond to the prompts using means well-known to those skilled in the art such as by pressing a digit on the phone or responding verbally. The commercially available telephony service interprets the input from the work provider in step 612 per rules specified in software code as is known to those skilled in the art, and if the task has been marked as complete, in step 614, a determination is made as to whether or not there are additional tasks for which status has not been updated.

If there are additional tasks for which status must be updated, then the process repeats in step 608 as the next task is read. If status has been updated for all tasks as determined in step 614, then the process proceeds to step 616 wherein the work provider is prompted to clock-out. If the work provider has no further work to do at the point-of-service, then in step 618 the work provider clocks-out.

Returning now to the task status update process, in step 612, if the work provider responds that the task has not been completed, in one embodiment, in step 614 the work provider is prompted to record a reason that the task was not completed. In another embodiment, in step 616, the reason provided in 614 is saved in the work management system as a voice message file via means well-known to those skilled in the art and enabled by telephony service providers such as Twilio, or is automatically transcribed to text using voice-to-text technologies provided by telephony service providers such as Twilio. After recording the reason, the process proceeds to step 614 wherein it is determined whether or not the status has been updated for all Tasks.

In another embodiment, the recording of the reason, whether in a voice message or in transcription, is accessible via web portal 300, preferably in a checklist interface 310.

In one embodiment, the work management system compares the caller ID of the telephone from which the work provider is calling to the contact information 306 of the client to verify that the work provider is at the proper location during the point in time at which status for each task is updated. In another embodiment, the work provider can hang up the phone at any point and resume the process at the step at which the work provider last left-off by calling the telephony service phone number again.

In one embodiment, as the status of tasks is updated via the telephony system, the updated status can be viewed via the web portal 300 via interface 310 as shown and described relative to FIG. 3. In another embodiment, alerts are provided via the web portal 300, via text messaging, via outbound calling as enabled via the telephony service, or other approaches known to those skilled in the art to the work manager, the work provider, persons associated with the client, or other stakeholders in the event that a clock-in is missed or if a task is not completed, completed, and/or marked with a status which is designated to trigger an alert. Thus, the telephony service in the work management system allows a variety of stakeholders to have real-time visibility of highly specific tasks without requiring a costly remote computer terminal such as, by way of example, a mobile computing tablet 400.

In another embodiment, the aforementioned telephony-accessible calendar system provides the capability of obtaining an electronic signature from one or more persons at the end of a work shift. In step 620, in one embodiment, said system uses text to voice technology to read information about the shift to said one or more persons, wherein information may include but is not limited to the clock-in time and the non-event task completion status, and the said one or more persons is prompted to provide an electronic signature to verify the information about the shift. In one embodiment, the electronic signature is provided via a confidential personal identification number ("PIN") that is known only to the person asked to provide verification and preferably in which the PIN is provided via the keypad of a telephone. In another embodiment, the electronic signature is provided via a voice recording that the signer leaves via a telephone, preferably after listening to the aforementioned information about the shift. In another embodiment, the PIN is used in conjunction with the voice recording to comprise a fraud- and falsification-resistant electronic signature.

In another embodiment, an indicator of the electronic signature is provided in an electronic log accessible via a web-based portal 300 for a work management system, preferably in association with related information about the shift 310. In another embodiment, a link to a copy of the voice-recorded signature is provided in an electronic log accessible via a web-based portal 300 for a work management system in association with related information about the shift 310.

Figure 7:
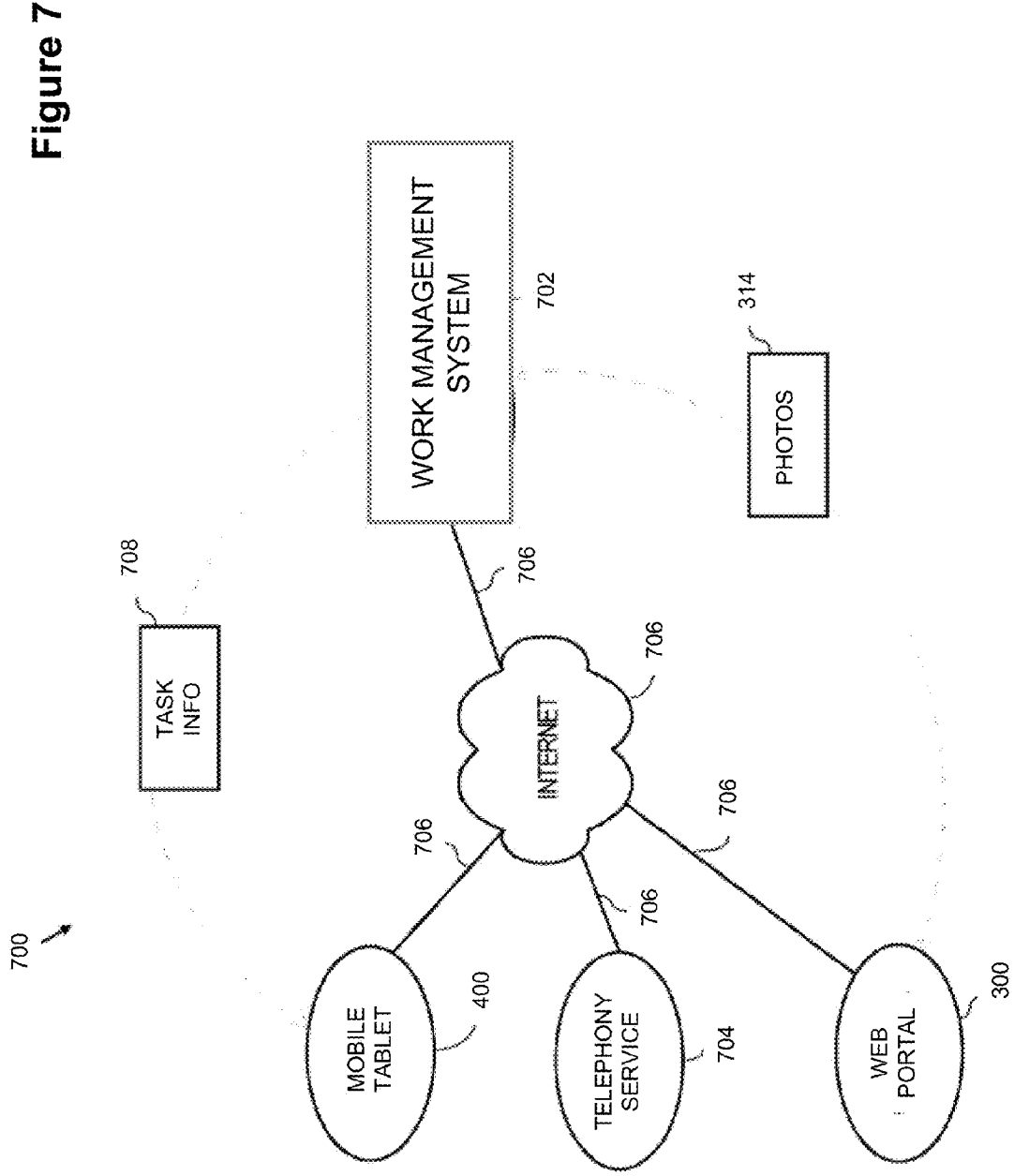
FIG. 7 is a block diagram that illustrates the communication of entities via Internet connections for the transmission of a variety of information.

FIG. 7 is a block diagram 700 that illustrates the communication of entities via Internet connections 706 for the transmission of a variety of information including but not limited to digital photographs 314 for display on a digital picture frame 400 and/or work management system 702 accessible via a web portal 300, task information 708, possibly including but not limited to updates to the completion status, telephony service 704 by which task information 708 and other information may be sent and received in order to enable updates to the work management system 702 accessible via the web portal 300, and the mobile tablet 400 also functioning, in one embodiment, as a digital picture frame as well as additional means by which task information 708 and other information may be sent and received to and from the work management system 702 accessible via the web portal 300.

In one embodiment, via a web portal 300, task information 708 may be input to the work management system 702, to be provided to a work provider via a mobile tablet 400 or via telephony service 704. The work management system 702 comprises a database, computer-enabled means to interpret software code, and computer-enabled means to communicate between various devices and interfaces accessing the work management system 702 including the mobile tablet 400, the telephony service 704, and the web portal 300. In another embodiment, the work management system includes computer and software-enabled means for displaying photos 314 and other media on the mobile tablet 400 when the mobile tablet 400 is not in use by a work provider to inform the completion of assigned tasks, to update task status, or to otherwise inform and manage the work plan.

Considering now a specific application by way of example and without limitation to the aforementioned, an in-home care agency managing a multitude of patients or clients and a multitude of caregivers realizes a great number of benefits via usage of the aforementioned embodiments. Today, many in-home care agencies use paper care journals at the point-of-care to manage care and record updates as to the completion of tasks. Unfortunately, the use of paper care journals makes it impossible for in-home care agency managers and family and adult children of elderly clients to closely observe the care provided.

The mobile tablet interfaces eliminate the need for paper care journals and enable real-time visibility to the point-of-care for in-home care agency managers and for the family of patients and clients. This significantly reduces costs and improves the quality of care.

For situations in which a mobile interface cannot be afforded, the telephony service provides a low-cost means leveraging patients and/or client's existing phone systems to achieve the same benefits with a level of granular visibility to the care provided and tasks completed that did not previously exist.

Additionally, the work management system disclosed provides an easy-to-use and intuitive means of scheduling a care plan via a calendar interface. Today, care plans and task scheduling are typically managed via paper care journals for in-home care agencies. When care plans are managed electronically, they are often managed with highly-detailed form templates that lack the dimension of scheduling of specific tasks at specific times. When a calendar is used, no greater granularity than a work shift is provided; current solutions lack task-specific granularity.

The task input calendar interface disclosed provides very critical improvements to these systems by providing a robust, highly flexible means of scheduling very detailed care plans with associated times for each task. Because of this critical enabling feature, it follows that the individual tasks can be output to a mobile tablet, a Internet connectable computer, and/or telephony services as described, and the status of tasks can also be updated via these channels. As such, it provides unprecedented visibility to the point-of-care allows new and beneficial features including but not limited to alerts if tasks that have been scheduled as part of the care plan are missed.

As discussed herein, the embodiments may involve a number of functions to be performed by a computer processor, such as a microprocessor. The microprocessor may be a specialized or dedicated microprocessor that is configured to perform particular tasks according to the embodiments described herein, by executing machine-readable software code that defines the particular tasks embodied by the embodiments and examples described herein. The microprocessor may also be configured to operate and communicate with other devices such as direct memory access modules, memory storage devices, Internet-related hardware, and other devices that relate to the transmission of data in accordance with the embodiments and examples described herein. The software code may be configured using software formats such as Java, C++, XML (Extensible Mark-up Language) and other languages that may be used to define functions that relate to operations of devices required to carry out the functional operations related to the embodiments and examples described herein. The code may be written in different forms and styles, many of which are known to those skilled in the art. Different code formats, code configurations, styles and forms of software programs and other means of configuring code to define the operations of a microprocessor in accordance with the embodiments and examples described herein will not depart from the spirit and scope of the embodiments and examples described herein.

Within the different types of devices, such as laptop or desktop computers, hand held devices with processors or processing logic, and also possibly computer servers or other devices that utilize the embodiments and examples described herein, there exist different types of memory devices for storing and retrieving information while performing functions according to the embodiments and examples described herein. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the embodiments and examples described herein when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the embodiments and examples described herein as described herein enable the physical transformation of these memory devices. Accordingly, the embodiments and examples described herein as described herein is directed to novel and useful systems and methods that, in one or more embodiments, are able to transform the memory device into a different state. The embodiments and examples described herein is not limited to any particular type of memory device, or any commonly used protocol for storing and retrieving information to and from these memory devices, respectively.

Embodiments of the systems and methods described herein facilitate the management of home care provider scheduling. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Finally, although specific embodiments and examples of the invention have been described and illustrated, the invention is not to be limited to the specific forms or arrangements of parts so described and illustrated. The scope of the invention is to be defined by the claims appended hereto and their equivalents.

The invention claimed is:

1. A telephony accessible calendar system for use in a home care scheduling system for scheduling multiple daily work shifts of home care providers, comprising:
   a scheduling computer system configured to organize a plurality of work shifts of remote operating home care workers and specify tasks for the work shifts;
   a confirmation computer system configured to:
   receive, over a voice telephony network, a clock in call from a worker of the remote operating home care workers for a work shift of the plurality of work shifts of the worker;
   in response to receipt of the clock in call, transmit to the worker, over the voice telephony network, a voice reading of tasks assigned to the worker for the work shift for the worker without issuing a prompt to at least one completion status update;
   in response to receipt of a first call subsequent to the clock in call, transmit to the worker, over the voice telephony network, a voice reading of the tasks assigned to the worker for the work shift of the worker, with the voice reading including prompts to provide at least one completion status update;
   receive, over the voice telephony network, at least one completion status update; and
   receive, over the voice telephony network, an electronic signature including at least one of a voice signature and a keypress signature affirming the completion status update.

2. A system according to claim 1, wherein the electronic signature is provided via a confidential personal identification number ("PIN") that is assigned to a person asked to provide verification.

3. A system according to claim 2, wherein the electronic signature is provided via a confidential PIN used in conjunction with a voice recording for a fraud and falsification resistant electronic signature.

4. A system according to claim 2, wherein the electronic signature is provided via a PIN used in conjunction with a voice recording as an electronic signature.

5. A system according to claim 1, wherein the electronic signature is provided via biometric means, wherein the biometric means includes voice authentication.

6. A system according to claim 1, wherein the electronic signature is provided by text to voice translator to read information pertaining to a shift to one or more persons, wherein information may include but is not limited to a clock in time and a non-event task completion status, and the one or more persons are prompted to provide an electronic signature to verify the information about the shift.

7. A system according to claim 1, further comprising an indicator of the electronic signature is provided in an electronic log accessible via website in association with related information about the shift.

8. A system according to claim 7, further comprising a voice signature module configured to record a voice recording as an electronic signature for the end of a work shift, the system further comprising an electronic log configured to maintain a record of voice recorded signatures and to provide a link to a copy of the voice-recorded signature via websites in association with related information pertaining to home care provider work shifts.

9. A system according to claim 1, wherein the scheduling computer system is a calendar system configured to manage non-event tasks in the calendar system.

10. A system according to claim 9, wherein the scheduling system is configured to store verification that the use of electronic signatures has been authorized.

11. A system according to claim 10, wherein the verification that the use of electronic signatures has been authorized allows use of the confirmation module by one or more persons.

12. A system according to claim 9, wherein the entry of a single non-event task can be made recurring on a daily, weekly, or monthly basis according to parameters set by the user.

13. A system according to claim 9, wherein the non-event task may be assigned to one or more persons or groups of persons for completion.

14. A system according to claim 9, wherein one or more users at remote locations may view the updated completion status of the one or more non-event tasks.

15. A system according to claim 9, wherein an exception state may be noted relative to the completion of one or more non-event tasks and a reason provided by an assigned person.

16. A system according to claim 9, wherein the completion status of the one or more non-event tasks is managed by a checklist interface.

17. The system of claim 1, wherein the confirmation computer system is further configured to:
detect ending of the first call;
receive a second call subsequent to the first call; and
in response to receiving the second call, resuming a voice reading of the tasks assigned to the worker for the work shift of the worker from a point at which ending of the first call occurred.

18. The system of claim 1, wherein the confirmation computer system is further configured to:
detect receipt of completion status updates for all tasks assigned to the worker for the work shift of the worker;
in response to detecting receipt of completion status updates for all tasks assigned to the worker for the work shift of the worker, issue a prompt, over the voice telephony network, to clock out; and
receive, over the voice telephony network, an electronic signature affirming completion of the work shift of the worker.

* * * * *

UNITED STATES PATENT AND TRADEMARK OFFICE
CERTIFICATE OF CORRECTION

| | | |
|---|---|---|
| PATENT NO. | : 9,824,334 B2 | Page 1 of 1 |
| APPLICATION NO. | : 13/180447 | |
| DATED | : November 21, 2017 | |
| INVENTOR(S) | : Geoffrey Howard Nudd | |

It is certified that error appears in the above-identified patent and that said Letters Patent is hereby corrected as shown below:

On the Title Page

At (73), please replace "Clearcare, Inc." with --ClearCare, Inc.--

At (57), Line 4, after scheduling, please insert --system--

Signed and Sealed this
Twelfth Day of November, 2019

Andrei Iancu
*Director of the United States Patent and Trademark Office*